United States Patent [19]
Clavin et al.

[11] Patent Number: 5,468,377
[45] Date of Patent: Nov. 21, 1995

[54] SOLID HALOGEN FEED SYSTEM

[75] Inventors: J. Steven Clavin, Langhorne; Bradley J. Peters, Warrington; Henry M. Schrandt, Collegeville, all of Pa.

[73] Assignee: Betz Laboratories, Inc., Trevose, Pa.

[21] Appl. No.: 140,251

[22] Filed: Oct. 21, 1993

[51] Int. Cl.$^6$ ............................................. C02F 1/76
[52] U.S. Cl. .................... 210/167; 210/206; 210/254; 210/101; 210/143
[58] Field of Search ..................... 210/754, 753, 210/101, 206, 143, 900, 167, 254, 198.1

[56] References Cited

U.S. PATENT DOCUMENTS

| | | | |
|---|---|---|---|
| 1,742,714 | 1/1930 | McGill | 210/254 |
| 2,820,701 | 1/1958 | Leslie | 210/206 |
| 3,326,747 | 6/1967 | Ryan et al. | 210/753 |
| 3,412,021 | 11/1968 | Paterson | 210/206 |
| 3,628,663 | 12/1971 | Derham et al. | 210/278 |
| 3,975,271 | 8/1976 | Saunier et al. | 210/753 |
| 4,261,837 | 4/1981 | West, Jr. et al. | 210/254 |
| 4,698,153 | 10/1987 | Matsuzaki et al. | 210/900 |
| 4,800,082 | 1/1989 | Karbowski et al. | 210/754 |
| 4,885,084 | 12/1989 | Doyle | 210/254 |
| 5,176,836 | 1/1993 | Sauer et al. | 210/753 |
| 5,348,663 | 9/1994 | Miers et al. | 210/754 |

OTHER PUBLICATIONS

BromiCide Application Guide by Great Lakes Chemical Corporation.
Bromicide (™)—A new Biocide for Cooling Water Systems—Cooling Tower Institute Paper TP–219A Presented at the Cooling Tower Institute–Houston, Tex. Jan. 1980.
Condensor Technology Symposium of the Electric Power Research Institute—Bromine Chmistry, an Alternative to Dechlorination by Great Lakes Chemical Corporation Session #3, Paper No. 38.
48th Annual Meeting International Water Conf., Pittsburgh, Pa. Nov. 1987—Bromine Chemistry an Alternative to Dechlorination in Cooling Water & Disinfection—Great Lakes Chemical Corp. & Purdue Univ.
Corrosion 88—Recent Advances in Halogen Based Biocontrol–Paper 19 Mar. 21–25, 1988.

Primary Examiner—Peter A. Hruskoci
Assistant Examiner—Theodore M. Green
Attorney, Agent, or Firm—Biebel & French

[57] ABSTRACT

A water treatment system including a tank for containing a solid treatment product such as a solid halogen. The water treatment system is adapted to be used in combination with a cooling system wherein treated water is fed to the cooling system through an outlet conduit leading from the tank. Drainage of water from the tank is facilitated by use of an eductor connected to an inlet conduit for the tank whereby water is drained from the tank to the inlet conduit and back to the outlet conduit, and is thereafter conveyed back to the cooling system. Thus, a closed system is formed by the treatment system in combination with an associated cooling system wherein the closed system is substantially environmentally safe in that drainage of the tank outside of the closed system is avoided.

2 Claims, 2 Drawing Sheets

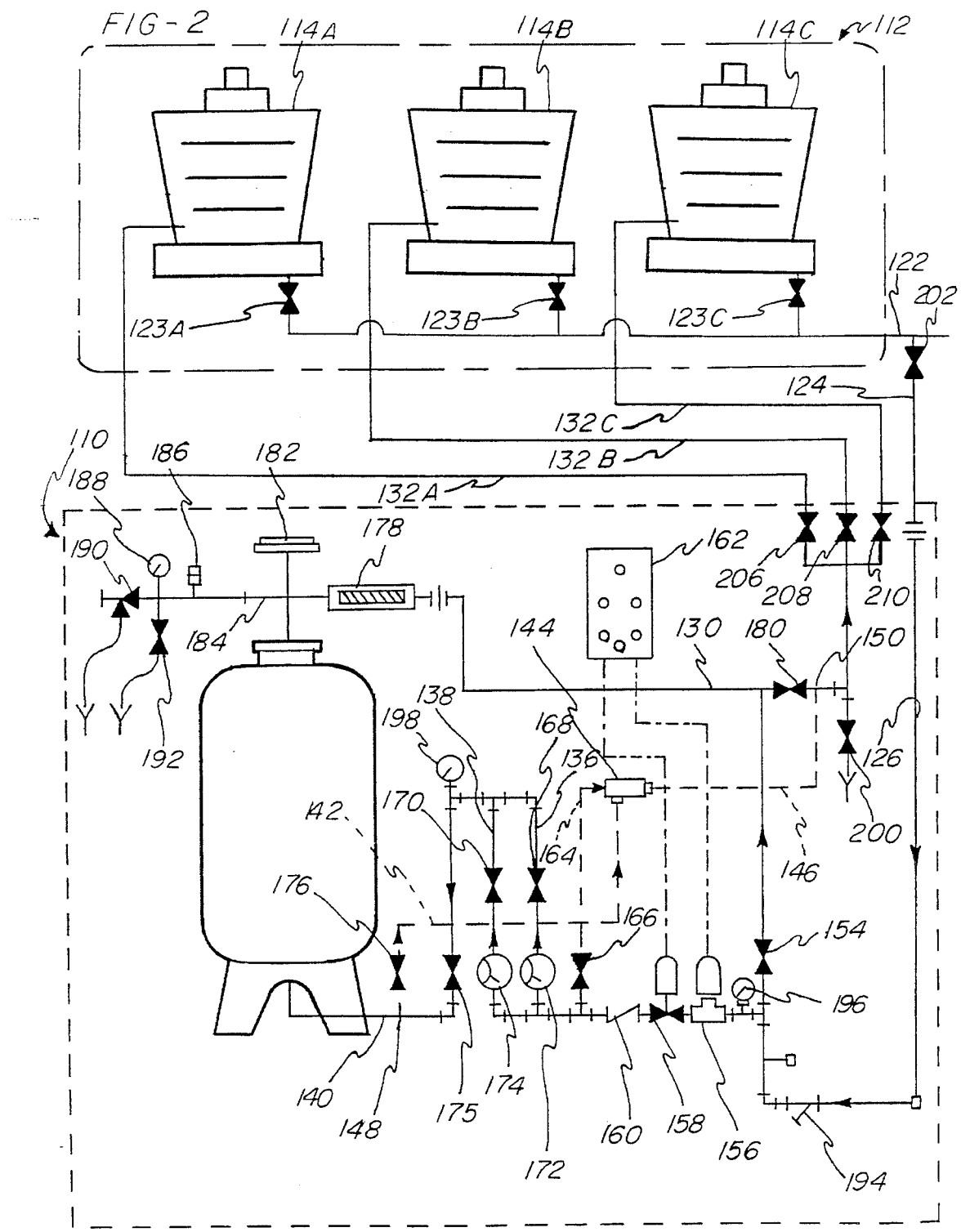

5,468,377

SOLID HALOGEN FEED SYSTEM

BACKGROUND OF THE INVENTION

The present invention relates to a water treatment system and, more particularly, to a solid halogen feed system to supply treated water to a cooling water system.

Cooling water systems, such as cooling towers, are typically warm and provide an environment which is conducive to the growth of algae, bacteria, slime forming fungi and other slime forming organisms.

Water treatment systems are commonly used in cooling towers in order to control fouling caused by biological organisms which could result in inefficiencies in the cooling system. In the past, cooling systems utilizing chlorine, such as gaseous chlorine, have provided the principal method for controlling biological growth. Recently, alternative biocides have been considered in response to concerns relating to the environment, operator safety, and liability issues raised by the use of gaseous chlorine in water treatment systems.

It has been found that certain solid treatment products, for example halogens, provide an acceptable alternative biocide which meets the environmental and safety requirements while also effectively controlling the growth of biological organisms. Systems for feeding halogenated water to a water cooling tower generally feed the treated water to the cooling tower on a timed basis wherein a controller having a timer causes a valve to open, permitting water to flow from the cooling tower make-up source through the solid halogen feed system and back to the cooling tower according to predetermined time periods.

Such solid halogen treatment systems typically contain a quantity of the solid treatment product within a tank which must periodically be refilled to ensure that an effective amount of the product is present at all times. During a refilling operation, the tank is first partially drained of water and the treatment product is then poured in through an aperture in the top of the tank. In prior art treatment systems, it has been common practice to drain the tank to an outside location such as to the ground. This practice may result in a potential environmental discharge violation and is therefore undesirable.

Accordingly, there is a need for a treatment system using a solid treatment product contained within a tank wherein the tank is easily drained during a refilling operation and wherein the draining of the tank is done in an environmentally safe manner.

SUMMARY OF THE INVENTION

The present invention provides a water treatment system for feeding a solid treatment product, such as halogen, to a cooling water system in order to control fouling within the cooling system resulting from the growth of biological organisms.

The treatment system includes a tank for containing the solid treatment product, an inlet conduit for conveying water from the cooling water make-up source to the tank in a forward inlet flow direction, an outlet conduit for conveying treated water from the tank to the cooling water system in a forward outlet flow direction, and an eductor for conveying water from the tank into the outlet conduit in a tank draining operation. Thus, the present treatment system is adapted to drain water from the treatment system back to the cooling system through the outlet conduit to thereby avoid discharging treated water outside of the system.

The eductor includes a suction inlet which is connected to the inlet conduit for conveying water from the tank during the tank draining operation, and an inlet port on the eductor is connected to a supply conduit for supplying water from the cooling water make-up system to the inlet conduit. A flow shut-off valve between the connection of the suction port with the inlet conduit and the connection of the inlet port with the supply conduit is provided whereby water supplied by the supply conduit during the tank draining operation is prevented from flowing into the tank through the inlet conduit.

The treatment system is further provided with a backwash flow path extending between the supply conduit and the outlet conduit. In a backwash mode of operation, water is directed from the supply conduit through the backwash flow path into the outlet conduit and into the tank. The water in the tank then passes out of the treatment system through the inlet conduit and the eductor wherein the water passes into the outlet conduit on a downstream side of a closed discharge valve which is located downstream from the connection of the backwash flow path with the outlet conduit.

In yet another aspect of the invention, the outlet conduit may be provided with three outlet valves located in parallel for alternately controlling flow of treated water through respective conduits extending from the treatment system to separate cooling water systems. The outlet valves may be controlled by a controller for automatically dispensing the treated water to the respective cooling towers.

Therefore, it is a primary object of the present invention to provide a water treatment system for providing treated water to a cooling water system wherein a flow path is provided for draining water to the cooling water system from a tank located in the treatment system.

It is a further object of the invention to provide a backwash flow path for the water treatment system wherein water is permitted to flow in a reverse flow direction through the tank and ultimately to the cooling water system through the flow path that is provided for draining the tank.

Other objects and advantages of the invention will be apparent from the following description, the accompanying drawings, and the appended claims.

BRIEF DESCRIPTION OF THE DRAWINGS

FIG. 2 is a diagrammatic view illustrating a second embodiment of the present invention wherein the treatment system is configured to provide treated water to three separate cooling systems.

DETAILED DESCRIPTION OF THE PREFERRED EMBODIMENT

Figure 1:
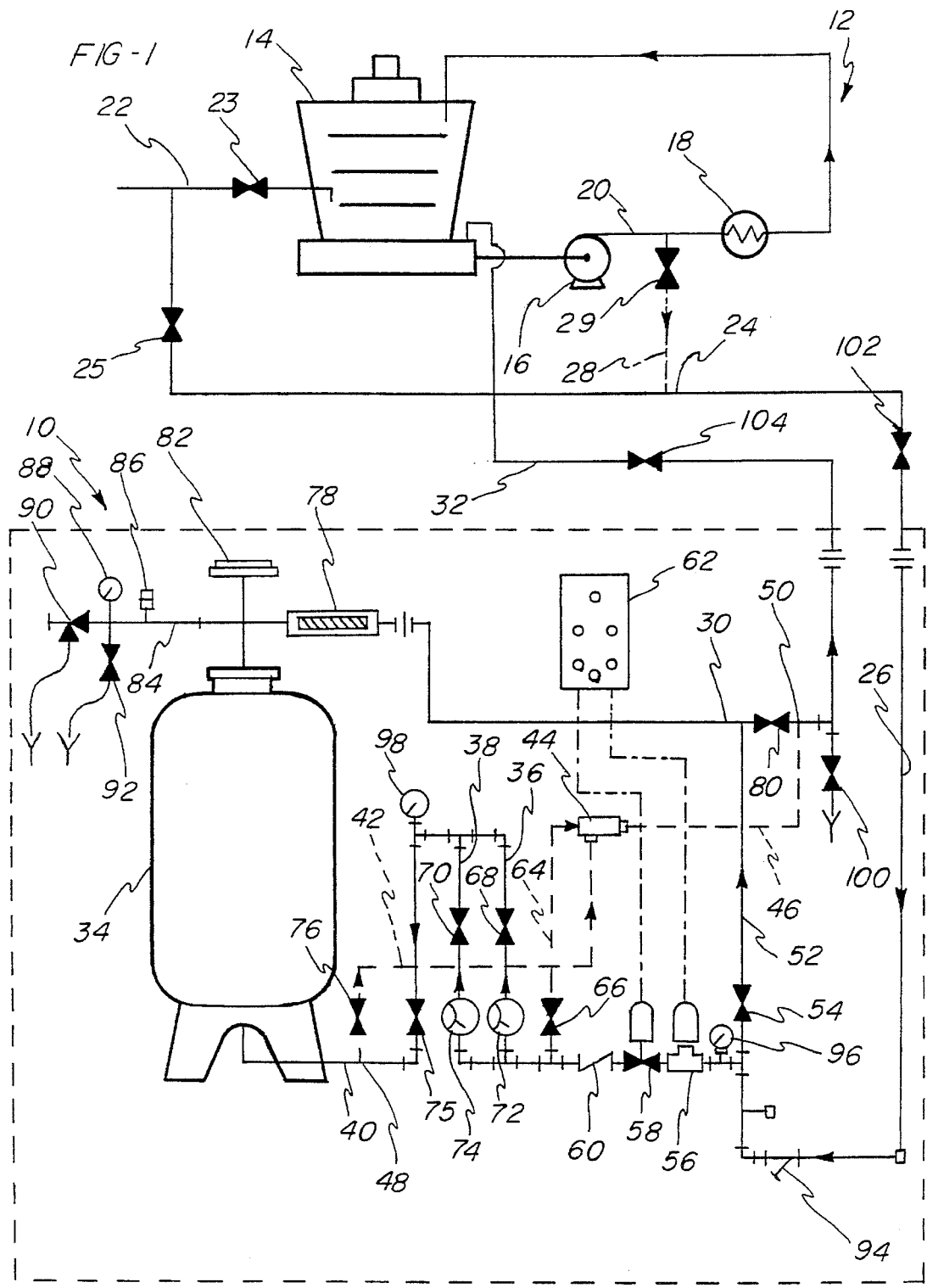
FIG. 1 is a diagrammatic view illustrating the treatment system of the present invention.

Referring to FIG. 1, the water treatment system of the present invention is illustrated in combination with a cooling water system 12 incorporating a cooling water cooling tower 14. The cooling water system 12 includes a pump 16 for drawing water from the cooling tower 14 and pumping it to a cooling load 18 through a fluid line 20. The water from the cooling load 18 is then recirculated to the cooling tower 14. In addition, a make-up water line 22 is provided for supplying make-up water from an outside water source (not shown). Water from the make-up source is conveyed from the make-up water line 22 to the treatment system 10 through a cooling system inlet conduit 24 through valve 25.

The conduit 24 is connected to a supply conduit 26 of the treatment system 10. Direct flow from the make-up source to cooling tower 14 is regulated by valve 23. In addition, an auxiliary branch 28 may be provided extending from fluid path 20 to the cooling system inlet conduit 24 and is controlled by valve 29.

Treated water is conveyed from the water treatment system 10 through a tank outlet conduit 30 which is connected to a cooling system delivery conduit 32. The treatment system 10 further includes a tank 34 for containing a solid treatment product, such as solid halogen, for treating water within the system 10. Preferably, the tank is ASME rated.

A first flow path is defined within the system 10 and includes the supply conduit 26, a pair of parallel flow control conduits 36, 38 extending from the supply conduit 26 and a tank inlet conduit 40 connected to the flow control conduits 36, 38. The tank outlet conduit 30 defines a second flow path within the treatment system 10 for conveying the treated water from the tank 34 to the cooling system 12.

In addition, the treatment system 10 includes a third flow path including an eductor suction conduit 42, an eductor 44 and an eductor outlet conduit 46. The eductor suction conduit 42 is connected to the inlet conduit 40 at a first junction 48 for drawing water from the tank 34, and the eductor outlet conduit 46 is connected to the tank outlet conduit 30 at a second junction 50.

A backwash conduit 52 is also provided extending from the supply conduit 26 to the tank outlet conduit 30. The backwash conduit 52 permits the treatment system 10 to operate in a reverse flow condition wherein water is supplied to the tank through the tank outlet conduit 30 in order to eliminate restrictions in the system, as will be described further below.

During a treatment mode of operation, water is supplied from the make-up source through conduit 24 to supply conduit 26 of treatment system 10. A backwash valve 54 in the backwash conduit 52 is closed such that the water will flow through a flow switch 56, a solenoid actuated inlet valve 58 and a check valve 60 to the parallel flow control conduits 36, 38, and then through an open flow shut-off valve 75 to the inlet conduit 40 which leads to the bottom of the tank 34. The flow switch 56 and inlet valve 58 are connected to a controller 62 wherein the controller 62 causes the valve 58 to move from a normally closed to an open position to permit flow, and the switch 56 causes an indicator light on the controller to illuminate at a relatively low flow rate, such as less than 1.5 gallons per minute. It should be noted that in the event of a system failure, the inlet valve 58 will move to its normally closed position to eliminate the possibility of an overfeed of product to the cooling system 12.

The flow control conduit 36 defines a flow path for providing relatively low flow rates, such as less than 15 gallons per minute and the flow path 38 is adapted to provide larger flow rates greater than 15 gallons per minute. Each of the flow control conduits 36, 38 includes a respective flow control valve 68, 70 and dial flow indicator 72, 74. Thus, the valves 68, 70 may be operated to obtain a wide range of water flow rates through the treatment system 10.

It should be noted that an eductor inlet conduit 64 is connected to the supply conduit 26 downstream of the check valve 60 for supplying water to the eductor 44 to create a suction within the eductor 44 during a tank draining mode of operation, as will be described further below. An eductor supply valve 66 is also provided and is maintained in a closed position during normal operation to direct water flow through the flow control conduits 36, 38. In addition, an eductor suction valve 76 is located within the eductor suction conduit 42 for preventing flow through the suction conduit 42 during the treatment mode of operation.

The water entering the tank 34 through the inlet conduit 40 will exit through the top portion of the tank 34 and flow through a diffuser 78 which includes a spiral slotted screen for catching and preventing solid particles of the treatment product from passing through the tank outlet conduit 30. In the preferred embodiment, the diffuser screen slot has a width of 0.05 inch whereby solid particles greater than 0.1 inch will be prevented from flowing out of the treatment system 10. After passing through the diffuser 78, the treated water will flow through a discharge valve 80 in the tank outlet conduit 30 and thereafter pass to the cooling system delivery conduit 32 to discharge into the cooling tower 14.

It should be noted that the top of the tank 34 is provided with a removable cap 82 for filling the tank with the solid treatment product. A vent conduit 84 is also provided including a vacuum breaker 86, pressure gauge 88, pressure relief valves 90 and a vent valve 92. The vent valve 92 may be opened during the initial filling of the tank 34 with water in order to permit air to discharge therefrom, and the pressure relief valves 90 prevent excessive pressure from building up within the tank during operation of the treatment system 10, such as may occur if the diffuser 78 becomes clogged.

During the normal course of operation of the treatment system 10, the solid treatment product will eventually become depleted such that it is necessary to occasionally check and replenish the product. If it is necessary to replenish the product, at least a portion of the water within the tank 34 must first be drained such that the water level within the tank 34 is below the product level in the tank 34. In order to check the inventory of the product within the tank 34, the shut-off valve 75 and discharge valve 80 are first closed and the vent valve 92 is cracked open to relieve pressure within the tank 34. When the pressure gauge 88 reads zero, the cap 82 is removed to permit the product level to be checked.

If product needs to be added to the tank 34, a tank draining mode of operation is performed wherein the eductor supply valve 66 and eductor suction valve 76 are opened to place the eductor 44 in fluid communication with the supply conduit 26 and the inlet conduit 40, respectively. A button on the controller 62 is then manually pushed to open the inlet control valve 58 whereby water will flow through the eductor supply conduit 64 into an inlet port in the eductor 44. The eductor 44 is of conventional construction and includes a restrictor plate such that a flow of water under pressure entering the eductor 44 through the inlet port and exiting through an eductor outlet port connected to the eductor outlet conduit 46 causes water to be sucked from the tank 34 through the eductor suction conduit 42, wherein the shut-off valve 75 isolates the flow of water through the eductor supply conduit 64 from the flow of water through the eductor suction conduit 42. Since the discharge valve 80 is closed, the water conveyed through the eductor outlet conduit 46 is conveyed through an outlet portion of the tank outlet conduit 30 to the delivery conduit 32 of the cooling water system 12. Thus, during the tank draining mode of operation, the water is maintained within a closed system and does not pose the environmental and safety problems associated with discharging water to a location outside of the system, such as onto the ground.

During the course of operation, the treatment system 10 may also become restricted or clogged due to a build up of material within the system, such as may result from material clogging the slotted screen of the diffuser 78. As noted above, the system 10 is provided with a backwash conduit 52 for producing a reverse flow through the system during a backwash mode of operation.

The procedure for implementing the backwash mode of operation includes closing the flow shut-off valve 75 and discharge valve 80, and opening the eductor suction valve 76 and the backwash supply valve 54. Thus, water will flow from the cooling system 12 into the supply conduit 26 and through the backwash conduit 52 to the tank outlet conduit 30 at the upstream side of the discharge valve 80. The water will flow in a reverse flow direction through the tank outlet conduit 30, through the diffuser 78, and into the top of the tank 34. The water will then exit the bottom of the tank through the inlet conduit 40 and the eductor suction conduit 42 whereby the water is directed from the system through the eductor outlet conduit 46 and the tank outlet conduit 30 at the downstream side of the closed discharge valve 80. In this manner, the treatment system 10 may be cleared of any material which may be restricting the flow within system 10 when it operates in a forward flow direction.

It should further be noted that the treatment system 10 is provided with a strainer 94 located in the supply conduit 26 to remove any particles traveling from the cooling system 12 which may act to plug spray nozzles located within the tank 34. In addition, a pressure gauge 96 may be provided upstream of the flow switch 56 and a temperature gauge 98 may be provided downstream of the flow control conduits 36, 38 wherein the gauges 96, 98 facilitate maintaining the system at an optimum pressure and temperature. Further, a sample valve 100 is provided downstream of the discharge valve 80 for facilitating monitoring of the system operation through sampling of the treated water.

In addition, an inlet isolation valve 102 is preferably provided in the cooling system discharge conduit 24 and an outlet isolation valve 104 is provided in the cooling system delivery conduit 32. The isolation valves 102, 104 permit the water of the cooling system 12 to be isolated from the water of the treatment system 10, for example, during an operation wherein the treatment system 10 is being physically connected to or disconnected from the cooling system 12.

FIG. 2 illustrates a further embodiment of the present invention wherein elements similar to the first embodiment are labeled with the same reference numeral increased by 100. In the second embodiment, the cooling system 112 comprises three separate cooling towers 114A, 114B, 114C, and it should be noted that in the illustrated embodiment, the cooling load loop for each of the cooling towers is not shown for the purpose of clarity in illustrating the invention.

The water for the cooling towers 114A, 114B, 114C is fed to a make-up conduit 122 from a suitable make-up source (not shown). Valves 123a, b and c, respectively regulate direct flow of make-up water to the individual cooling towers. In order to benefit from halogen treatment, valves 123a–c are closed with valve 202 opened to direct make-up flow through make-up inlet conduit 124 which in turn communicates with inlet conduit 126 of the solid halogen containing water treating system 110.

The water treatment system of the present embodiment operates in a manner which is identical to that of the previous embodiment with the exception that three outlet valves 206, 208, 210 are located in the tank outlet conduit 130 downstream of the discharge valve 180. Cooling system delivery conduits 132A, 132B, 132C lead from the outlet valves 206, 208, 210, respectively, to the cooling towers 114A, 114B, 114C. In addition, each of the outlet valves 206, 208, 210 is preferably controlled by the controller 162 which is adapted to operate the outlet valves 206, 208, 210 at different preselected times and for different time periods for providing treated water to each of the individual cooling towers 114A, 114B, 114C.

From the above description of the present invention, it should be apparent that the water treatment system of the present invention provides an effective system for automatically controlling treatment of water using a solid treatment product. In addition, the present treatment system overcomes environmental and safety problems associated with prior art systems through the use of an eductor to facilitate discharge of water from a tank in the treatment system tank back into a cooling system without requiring discharge to a location outside of the system.

While the forms of apparatus herein described constitute preferred embodiments of the invention, it should be understood that the invention is not limited to these precise forms of apparatus, and that changes may be made therein without departing from the scope of the invention, which is defined in the appended claims.

What is claimed is:

1. Apparatus adapted for use in combination with a cooling water system comprising:

(a) tank means for containing a solid treatment product for treating water;

(b) first flow path means for conveying water to said tank;

(c) second flow path means for conveying treated water from said tank to said cooling water system;

(d) an eductor means;

(e) third flow path means connected at a first junction to said first flow path means for draining water from said tank through said eductor means to said water system wherein said third flow path means is connected to said second flow path means at a connection point, said third flow means including a discharge valve means located between said connection point and said tank means for preventing flow of water to said tank means through said second flow path means during said draining of water from said tank through said third flow path.

2. Apparatus as in claim 1, including a backwash flow path means extending between said first flow path means and said second flow path means wherein said backwash flow path is connected to said second flow path between said discharge valve and said tank for supplying water to said tank through said second flow path means in a reverse flow direction.

\* \* \* \* \*